July 25, 1939.　　　　L. B. KIMBALL　　　　2,167,266

VALVE FOR AUTOMATIC CONTROL OF SUPPLEMENTARY LIQUIDS

Filed April 8, 1938

INVENTOR
LEO B. KIMBALL
BY
Edward W. Vaill
HIS ATTORNEY.

Patented July 25, 1939

2,167,266

UNITED STATES PATENT OFFICE 2,167,266

VALVE FOR AUTOMATIC CONTROL OF SUPPLEMENTARY LIQUIDS

Leo B. Kimball, New Haven, Conn., assignor to Fuel Development Corporation, a corporation of Delaware Application April 8, 1938, Serial No. 200,860

1 Claim. (Cl. 137—153)

This invention relates to the fractional supply of supplementary liquids to the intake conduits of internal combustion engines and involves certain improvements over the valves described and claimed in my prior Patent No. 2,037,908 granted April 21, 1936.

In general, the valve described and claimed in the present case operates automatically in much the same way as those of the type described and claimed in my said prior patent but has certain valuable parts and advantages over that of said patent.

In my prior Patent No. 1,974,072 a "Method of supplying a supplementary fluid to an internal combustion engine" is claimed, and said method may be applied to the operation of the present valve.

Although the present valve is an improvement over the valve of my prior Patent No. 2,037,908, it also includes means for manually varying the flow of a supplementary liquid, regardless of the action of the automatic means.

Figure 1:
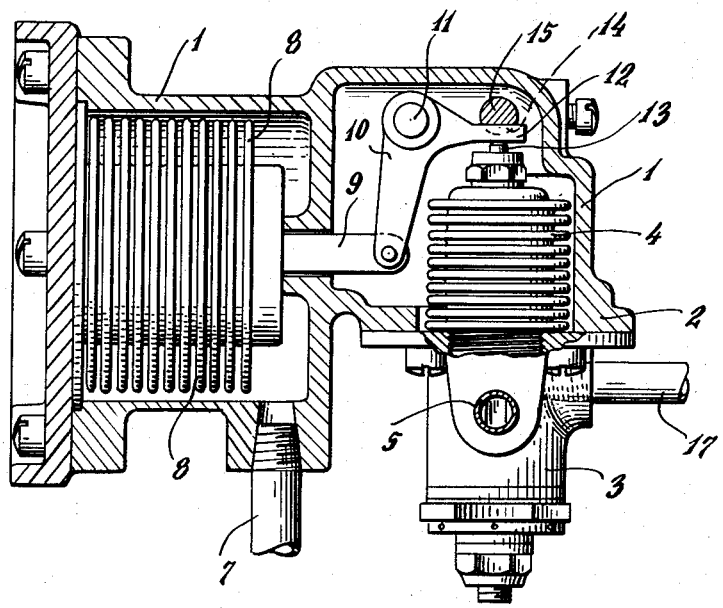

For a detailed description of a preferred form of the valve comprising my present invention, reference may be had to the following description and to the accompanying drawing illustrating the same, in which, Figure 1 is a side elevation, partly in section, showing the general form and some of the internal parts in section.

Figure 2:
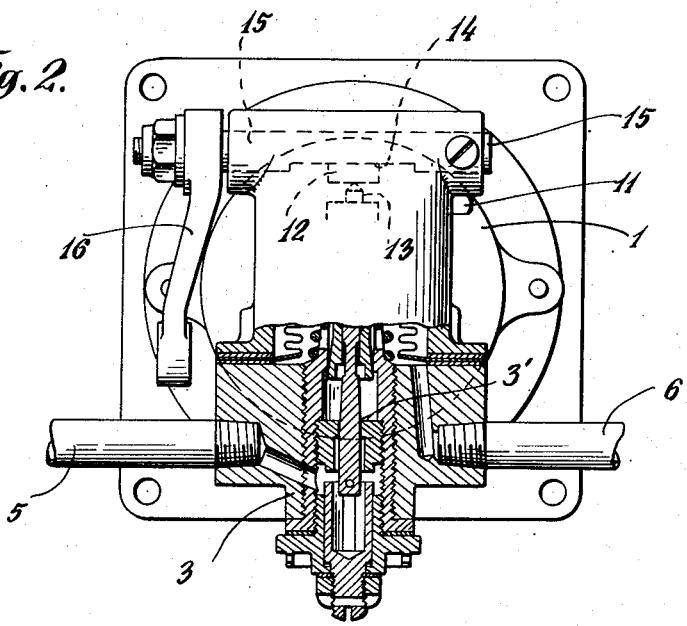

Fig. 2 is an end elevation showing especially the means for manually operating the controlling member or cam that may become active when necessary or in the event of an emergency, to supply more of the supplementary liquid than would be supplied under restricted automatic action of the valve.

In the drawing the numeral 1 indicates a casing that is provided with means such as provided by the flange 2 for attaching it to a second casing 3, containing a metering valve as in my prior patents, and a flexible bellows-like member 4 of the general types as those illustrated in the lower part of Fig. 5 of my prior valve Patent No. 2,037,908. The supplementary liquid passes through the metering valve 3' by entering and leaving said second casing 3 through the pipe connections 5 and 6. Either of the pipe connections 5 or 6 obviously connects with a tank or other suitable source of the supplementary liquid and with the engine intake, respectively. The pipe connection 7 communicates with the supercharger or blower of an aircraft, or other suitable source of extraneous pressure that will act to vary and control the action of the flexible bellows-like means 8 within the main or horizontal portion of the casing 1. The means 8 is provided with a projecting stud 9 that passes loosely through an opening about the same in the casing and is pivoted to one arm 10 of a bell-crank lever that is rotatable on the shaft 11. The other arm 12 of the bell-crank lever contacts with the outer end of the metering valve spindle as indicated at 13 and by such device the movement of the bellows-like means 8 is made effective upon the metering valve and the cut off valve in the second casing 3.

Above the arm 12 of the bell-crank lever 10—12 is a cam member 14, which in this form of the apparatus consists of a flattened portion of a transverse shaft 15 that passes through bearings in the casing 1 and is provided at one end with a crank arm 16 or other member to which may be attached an operating connection, such as a rod or other device, that runs to any convenient location on the instrument board of the vehicle and within easy reach of the operator. Tube 17 runs to a pressure gauge.

In view of the above described arrangement of the parts of my device it will now be seen that the supply of the supplementary liquid is controlled primarily by the pressure produced in the supercharger or blower which contains a rotating member that revolves in unison with and in proportion to the rate of rotation of the engine crankshaft or shafts. That rate and the power output is determined in the usual way by operation of the throttle valve to increase or diminish the speed of the vehicle or to provide more or less power such as when climbing hills or attaining greater altitudes. The greater the rate of rotation of the crank shaft, the greater will be the pressure produced by the supercharger or blower and therefore the inflow of the supplementary fluid will be induced by the supercharger action produced by the engine. Thus far, the action of the present valve is similar to that described in my prior Patent No. 2,037,908.

However, in case of emergency conditions or other demands that require certain quantities of the supplementary liquid not supplied by the automatic action of the valve, means must be provided whereby the pilot or operator can be enabled to admit required quantities of the supplementary liquid.

Such means I have provided by placing the cam member 14 on the transverse shaft 15, and said cam may be operated when an emergency or other unusual demand for the action of the supplementary liquid occurs. Then the pilot or operator may have recourse to the control member on the instrument board that moves transverse shaft 15 by actuating the crank arm 16 or other operative member. That will tilt the flat portion of the cam 13 so that the valve spindle of the metering valve 3' and of the main admission valve within the casing 3 will be depressed, thereby opening such means to a greater extent (if previously open at all) and some or more of the supplementary liquid will be admitted to the mixing chamber or intake passages of the engine.

In the case of an emergency, such as when the engine might become over-heated or on any other occasion that requires a greater supply of the supplementary liquid, takes place, the pilot or operator may operate the emergency control cam member 14 from the instrument board so as to supply a desired amount of the supplementary liquid.

From the above it will be apparent that the engine may be supplied with the supplementary liquid not only when certain power is required of the engine but also when the engine or external air conditions become abnormal at different altitudes or even when operating practically at sea-level.

Having thus described this form of my invention, I do not wish to be understood as being limited to the details thereof for various changes may be made by those skilled in the art without departing from the spirit of my invention as set forth in the accompanying claim.

What I claim and desire to protect by Letters Patent is:

A valve for controlling and metering the flow of varying amounts of a supplementary liquid introduced under fluid pressure to the intake passages of an internal combustion engine comprising an automatic bellows-like pressure responsive device, a movable metering member in said valve that is connected with and actuated by said device, an opening communicating with the space surrounding said pressure responsive device and adapted to receive a conduit running to the pressure portion of the intake passage of said engine, a second pressure responsive bellows-like device, connected with said metering member and having the external space about the same communicating with the aforesaid space, a mechanical connection between the movable parts of said bellows-like members and said metering member, and a manually operated adjusting device bearing upon said connection for controlling the opening of said valve and adjusting the position of said metering member when additional amounts of supplementary liquid that are not supplied through the action of said pressure means are necessary.

LEO B. KIMBALL.